Dec. 29, 1942.                J. G. TYKEN                 2,306,836
                         POWER TRANSMISSION
                        Filed May 3, 1941            2 Sheets-Sheet 1

INVENTOR
John G. Tyken.
BY
Harness, Lind, Patta Harris
ATTORNEYS.

Dec. 29, 1942.   J. G. TYKEN   2,306,836
POWER TRANSMISSION
Filed May 3, 1941   2 Sheets-Sheet 2
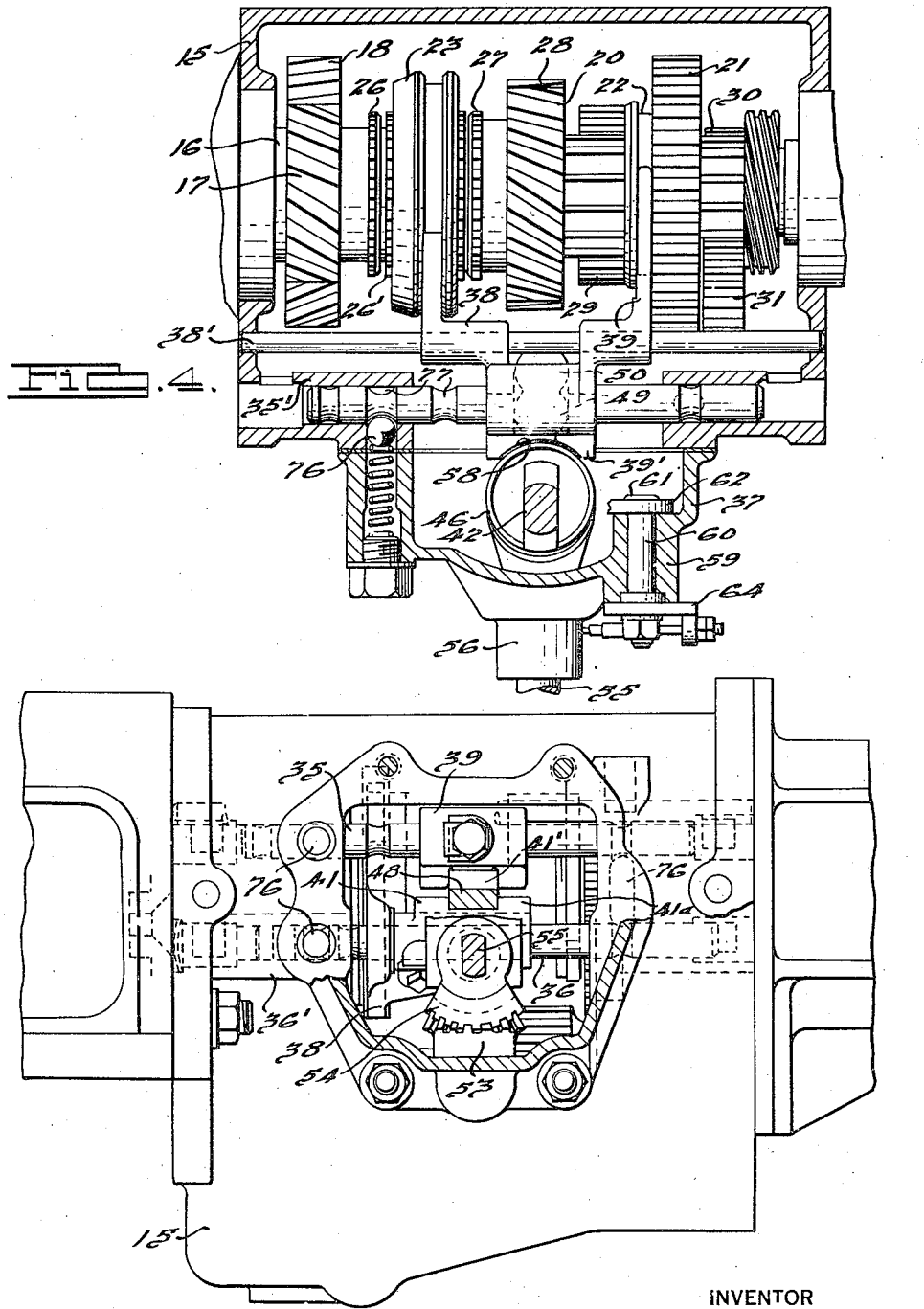
INVENTOR
John G. Tyken.
BY
Harness, Dich, Patee & Harris
ATTORNEYS.

Patented Dec. 29, 1942

2,306,836

UNITED STATES PATENT OFFICE 2,306,836

POWER TRANSMISSION

John G. Tyken, Detroit, Mich., assignor to Chrysler Corporation, Highland Park, Mich., a corporation of Delaware Application May 3, 1941, Serial No. 391,664

5 Claims. (Cl. 74—473)

This invention relates to improvements in variable speed transmission mechanism of the type particularly adapted for use in motor vehicles.

The principal object of the invention is to provide an improved selector and shifter mechanism for the transmission shift rails which will be positive in action, smooth in operation and economical to manufacture.

Efforts have been made to lower the bodies of motor vehicles in order that sufficient head room may be provided without increasing the overall height; a low body being desirable from the standpoint of appearance and vehicle stability. Accordingly, the control for the change speed transmission have been moved from the top of the transmission casing to the side thereof. In types of transmissions wherein a vertical rockshaft is provided for shifting the rails (such as those disclosed and claimed in the copending applications of Frederic W. Slack, Serial No. 293,657, filed September 7, 1939, and Otto E. Fishburn, Serial No. 332,910, filed May 20, 1940) it is necessary to mount the shift lever on the top of the casing whereby the lever is rendered inaccessible and the height of the transmission is excessive. Mounting of the lever on the bottom of the casing has been proven infeasible because of leakage of lubricant around the shaft.

I have provided a structure which overcomes these difficulties in a simple and economical manner.

An additional object is therefore to provide control mechanism for selecting and shifting the transmission shift rails which is adapted to be mounted on the side of the transmission casing.

A further object is to provide in a selector and shifter mechanism of the aforesaid type improved means for retaining the shift finger in engagement with a selected one of the shift rails which means is also operable to lock the other shift rail against movement.

A still further object is to provide in a mechanism of the aforesaid type operating members which rotate during shifting of the transmission gears and in which no sliding of the parts is necessary.

Further objects and advantages of the invention will be apparent from the following description taken in conjunction with the accompanying drawings, in which:

Fig. 4 is a sectional view along line 4—4 of Fig. 3.

Fig. 5 is a sectional view along line 5—5 of Fig. 3.

Figure 2:
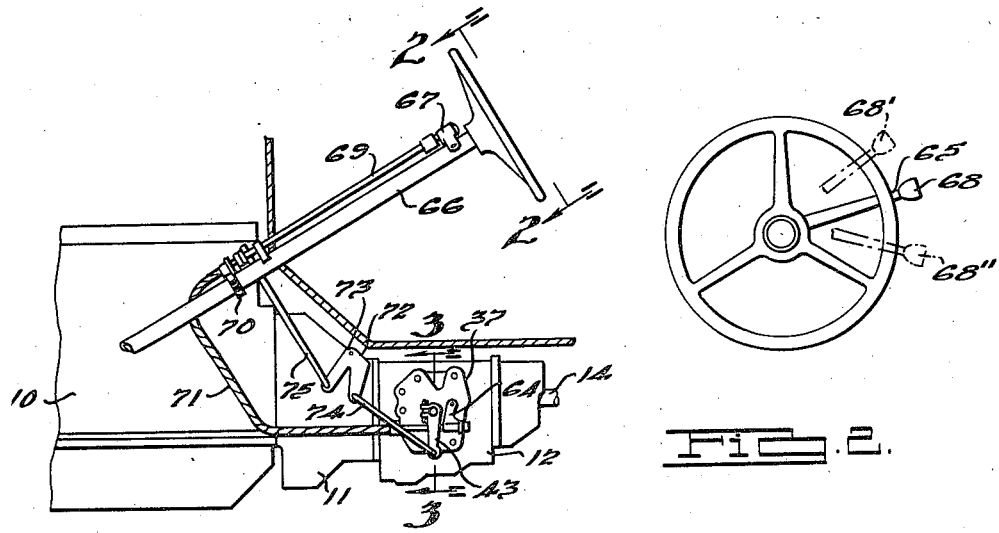
Fig. 2 is a plan view of the steering wheel and shift lever assembly as viewed in the direction of the arrows 2—2 in Fig. 1.

In the drawings is illustrated an embodiment of the invention in a motor vehicle drive including a unitary power plant having an engine 10, clutch 11 and transmission mechanism, generally designated by the numeral 12, a drive shaft 14 extending rearwardly from the transmission to the rear wheels (not shown) of the vehicle.

The transmission 12 includes a housing 15 (Fig. 4) into which extends a driving shaft 16, having a gear 17 meshed with a gear 18 fixed on a counter shaft 19 which is journalled at its opposite ends in apertures in the end walls of the housing 15. The driven shaft 14 extends into the housing 15 and has a gear 20 journalled on its internal end portion. A slidable gear 21, disposed on the right side of the gear 20 and splined on the shaft 14, is provided with a shifter fork receiving collar 22. Formed on the adjacent sides of the gear 17 and 20 are hub portions which are provided with external clutch teeth 26 and 27, respectively. Splined on the shaft 14 is a hub member having teeth 26'. A shiftable clutch member 23 is splined on the hub member at a location between the hub portion of the gears 17 and 20 and provided with internal clutch teeth with which the clutch teeth 27 and 26 respectively are adapted to be selectively meshed as is well known in the art. A direct drive setting of the gears may be produced by shifting the clutch member 23 to the left, as viewed in Figs. 4 and 5, to connect the clutch teeth 26 with the teeth 26'. When the clutch member 23 is shifted to the right, the teeth 27 and 26' are connected thereby holding the gear 20 against rotation relative to the shaft 14. The gear 20 is permanently meshed with a gear 28 on the countershaft 19 by which the gear 20 and shaft 14 are driven to establish a second speed drive. Low speed and reverse settings of the transmission may be established by shifting the gear 21 into mesh with a gear 29 on the countershaft 19 and with a reverse gear 31 driven by a pinion 30 on the countershaft respectively.

A pair of shifter rails 35 and 36 extending longitudinally of the transmission at one side thereof are shiftably mounted in bosses 35' and 36' of the housing 15. A pair of laterally extending shifter forks 38 and 39 are slidably mounted on a rod 38' fixed in the housing at each end thereof, and respectively engage the grooves of the shift collars 23 and 22 as illustrated. The fork 38 is provided with a pair of spaced lugs 41 and 41ᵃ between which is receivable a rail shifting finger 48, which also has a part which is receivable into a notch 41' in the fork 39.

That portion of the control apparatus which is directly connected with the transmission mechanism housing is mounted on a cover 37 which is provided for closing the side opening of the transmission housing. The cover 37 includes a crowned central portion having opposite top and bottom wall portions extending longitudinally of the transmission in which are formed registering openings 44 and 45.

A shaft 42 is journalled at each end in openings 44, 45 provided in the cover 37 and is retained therein by a set screw 42'. The shaft 42 is provided on each side with flat surfaces as indicated at 45' which form part of a non-rotatable driving connection between the shaft 42 and a trunnion member 46 carried by the shaft for rocking movement about an axis disposed at right angles to the axis of the shaft. The trunnion member 46 has the rail shifting finger 48, heretofore referred to, formed integrally therewith and the latter is provided with an intermediate lobe portion 49 (Fig. 4) receivable between the lugs 41—41ᵃ of the shift yoke 38 carried by rail 36 and an outer lobe portion 50 adapted to be received by the notch 41' of the yoke 39 carried by rail 35.

The trunnion member 46 is rockably mounted on the shaft 42 by means of a trunnion pin 51 which is received by aligned holes provided in the shaft 42 and trunnion member 46.

Figure 3:
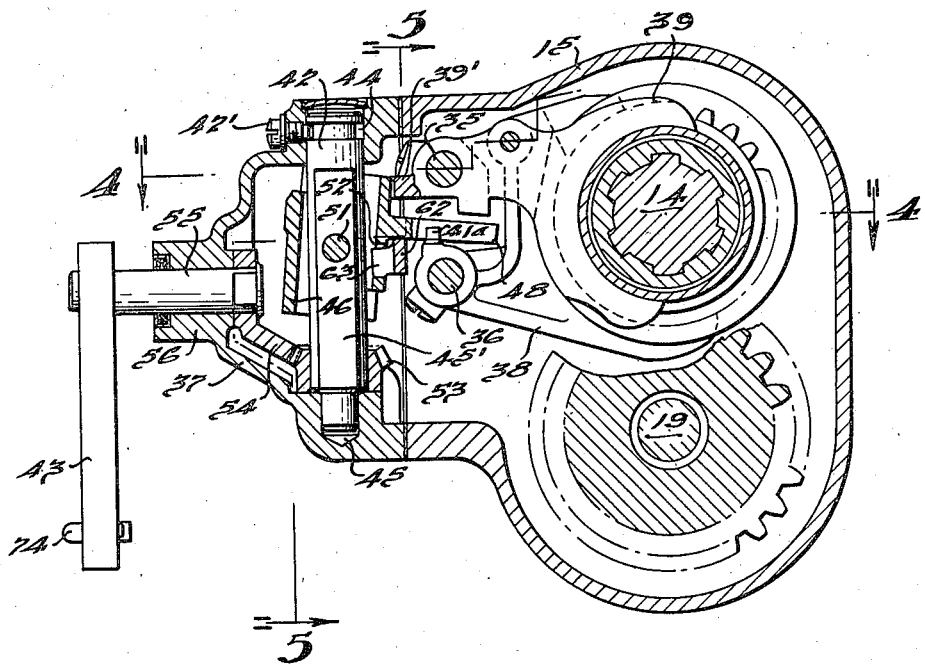
Fig. 3 is a sectional view taken along line 3—3 of Fig. 1.

The shift yoke 39 which is carried by the rail 35 is, as aforesaid, provided with a notch 41' for receiving the finger 48. In addition, yoke 39 is provided with an integral extension 39' having an arcuate recess 58 into which is received the top marginal portion of the trunnion member 46 when the latter is in the Fig. 3 position. When in this position, therefore, rotation of the shaft 42 will shift the rail 36 while the rail 35 remains locked against shifting because of the engagement of the trunnion member 46 with the portion 39' of yoke 39. The rail 36 is the second-high speed rail and in order to shift the low-reverse speed rail 35, it is, of course, necessary to rock the trunnion member 46 about the pin 51 to engage the finger 48 with the notch 41' and disengage the top portion of member 46 from the arcuate recess 58, which action is accomplished by means about to be described.

As illustrated in Fig. 4, the cover 37 has a transversely extending boss 59 in which is rotatably mounted a shaft 60 having a flattened inner end 61 on which is carried an arm 62. The latter has a rounded lug 63 which engages a hole 52 in the trunnion member 46. A selector lever 64 (Figs. 1 and 4) is non-rotatably mounted on the outer end of the shaft 60 for actuation by the driver through means about to be described.

Fixed on the rockshaft 42 near the lower end portion thereof is a bevel gear 53 which meshes with a bevel gear segment 54 carried by a shaft 55. A lever 43 is fixed on the outer end of the shaft and it is apparent from Fig. 3 that swinging of the lever 43 will effect rocking of the shaft 42 through the action of the gears 53, 54.

Apparatus for manually actuating the trunnion member 46 may be mounted at any location in the driver's compartment of the vehicle within convenient reach of the driver. Any suitable apparatus may be used, that being shown in Figs. 1 and 2 preferably being employed, although any suitable apparatus such as that shown in the copending application of Frederic W. Slack, Serial No. 293,657, filed in the United States Patent Office on September 7, 1939, may be employed.

Figure 1:
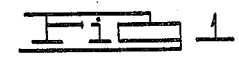
Fig. 1 is a diagrammatic, fragmentary, vertical sectional view of a motor vehicle embodying the present invention.

In Figs. 1 and 2, the manual control apparatus comprises a gear shift lever 65 which is carried on the steering column 66 of the vehicle by means of a bracket 67. The manual control lever is preferably of stamped construction and has a knob 68 on its outer end. The inner end of the aforesaid lever is pivotally mounted on the steering column 66 and is operatively connected with a rod 69 which is carried on the steering column 66 in parallel relation thereto by means of the bracket 67 and a bracket 70 carried by the lower portion of the steering column. Suitable mechanism is provided such that rocking of the lever 65 in a direction generally parallel with the axis of the steering column 66 will cause the rod 69 to be reciprocated axially of the steering column. A Bowden cable assembly 71 operatively connects the selector lever 64 with the rod 69 and is adapted to transmit motion between the rod 69 and the lever 64. A bellcrank lever 72 is pivotally mounted on the clutch housing 11 at 73 and has an arm connected with the transmission shift lever 43 by means of a link 74 and a second arm connected with a rod 69 by a link 75. The arrangement is such that rocking of the rod 69 about its longitudinal axis will cause a corresponding rocking motion of the bellcrank 72 and the transmission shift lever 43.

When the knob 68 of the manually operated shift lever 65 is in the full line position as illustrated in Fig. 2, movement thereof in a counterclockwise direction about the axis of the rod 69 to the position designated 68' in Fig. 2 will impose a pull on the links 75 and 74 which will in turn swing the shift lever 43 forwardly about the axis of the shaft 42. This in turn, through the intermediary of the gears 53 and 54, will cause the shift rail 36 to be moved toward the right of Figs. 4 and 5 so as to engage the clutch sleeve 23 with the teeth 27 to thereby establish a second speed ratio setting of the transmission. When the knob 68 is moved in a clockwise direction to the position designated 68'', the links 75—74 will push the lever 43 rearwardly and the rail 36 will be shifted toward the left of Figs. 4 and 5 to engage the clutch sleeve 23 with the teeth 26 to thereby establish a direct drive setting of the transmission. Suitable detent mechanism indicated at 76 in Figs. 4 and 5 is adapted to engage recesses 77 provided in each of the shift rails 35 and 36 for yieldably maintaining the rails in the desired positions.

Upward movement of the manually operated lever 65 about its fulcrum in the bracket 67 will cause rod 69 to be moved axially upwardly and, through the Bowden cable 71, will swing the selector lever 64 forwardly about the axis of the shaft 60, thereby swinging the arm 62 upwardly to rock the trunnion member 46 about the axis of pin 51, this action disengaging the lobe 49 of shift finger 48 from the second-high speed rail 36 and engaging the lobe 50 thereof with the low-reverse speed rail 35, at the same time disengaging the upper marginal inner portion of the trunnion member 46 from the arcuate recess 58 of the shift yoke portion 39'. Counterclockwise swinging movement of the shift lever 65 under these conditions will, through the intermediary of the links 74, 75, the bellcrank lever 72 and gears 53, 54, move the shift rail 35 toward the right of Figs. 4 and 5 to mesh the gear 21 with reverse idler gear 31 thereby to establish a reverse setting of the transmission. Clockwise movement of the lever 65 to the position 68″ while holding the said lever 65 to the uppermost position will likewise move the rail 35 leftwardly of the said figures to mesh the gear 21 with gear 29 thereby establishing low speed ratio setting of the transmission.

The manually operable shift mechanism illustrated in Figs. 1 and 2 is more fully described in the aforesaid Frederic W. Slack application, Serial No. 293,657.

A suitable interlock 76 (Fig. 5) is provided to lock one of the shifter rails against accidental movement while the other is being shifted.

In describing the operation of the device, let it be assumed that the motor vehicle is at rest with the motor running and the manually shiftable lever 65 positioned in the neutral position as indicated in full lines in Fig. 2. In starting the vehicle, the operator depresses the clutch pedal in the usual manner and grasps the knob 68 of lever 65 and rocks the lever about its fulcrum in the bracket 67 longitudinally upwardly of the steering column. This action causes rod 69 to be moved longitudinally upwardly of the steering column and exerts a pull on the cable 71 to thereby swing the selector lever 64 forwardly about the axis of the shaft 60, this action rocking the trunnion member 46 about the pin 51 thereby to disengage the shift finger from rail 36 and engage it with rail 35 at the same time unlocking rail 35 for shifting movement. Shift lever 65 is then pulled backwardly or clockwise of the steering column 66 which action rotates the rod 69 and, through the intermediary of the link 75, bellcrank lever 72, link 74 and gears 53, 54, swings the transmission shift lever 43 rearwardly thereby effecting rotation of the shaft 42 and trunnion member 46 to shift rail 35 with which the finger 48 is now operatively connected to mesh gear 21 with gear 29 to establish low speed drive through the transmission. Engagement of the vehicle clutch (not shown) will then cause the vehicle to be driven forwardly in low gear.

Shift to second or intermediate speed is accomplished by swinging the lever 65 forwardly (counterclockwise) while at the same time urging it into its lower path of movement whereupon gear 21 will be disengaged from gear 29 and sleeve 23 will be engaged with clutch teeth 27, the member 46 being rocked about pin 51 by the arm 62 during passage through neutral position to release rail 35 and pick up rail 36.

The shift from second speed to high speed setting of the transmission is accomplished by movement of the knob 68 from the position 68′ to the position 68″ while the knob is in its lower path of movement. This results in forward swinging of the lever 43 through the intermediary of links 75, bellcrank lever 72 and link 74 and moves clutch sleeve 23 forwardly to mesh with the teeth 26.

Reverse setting is obtained by swinging the lever 65 to position 68′ while holding it in its upper path of movement, thereby meshing gear 21 with idler gear 31.

With the present arrangement, the low speed rail 35, together with its asssociated mechanism, is positively locked in neutral position by engagement of the inner marginal top portion of the trunnion member 46 with the arcuate recess 58 of the yoke portion 39′ of yoke 39 at all times when the shift finger 48 is engaged with high speed rail 36. Movement of the transmission shift lever 43 to rotate shaft 42 and trunnion member 46 for shifting sleeve 23 does not effect this locking arrangement because of the arcuate relationship between the trunnion member 46 and the yoke portion 39′. Therefore, during a fast shift from low speed to second speed, shift finger 48 may be rapidly moved out of engagement with the yoke 39 and into engagement with the yoke 38 at the instant the parts come to neutral position and simultaneously the top portion of trunnion member 46 will engage yoke portion 39′ thereby making it impossible for rail 35 to continue moving past neutral position.

It should also be noted that a positive crossover action is obtained when the lever 65 is rocked about its fulcrum at 67 because of the engagement of the lug 63 with the trunnion member 46, thus locking of rail 35 before rail 36 is moved is assured.

It will thus be seen that I have provided a simple shift mechanism using bevel gears or, more properly, a gear and segment which is adapted for mounting on the side cover of the transmission casing.

Various changes will undoubtedly occur to those skilled in the art and it is not intended to limit the invention in its broader aspects to the precise details shown and described herein, the scope of the invention being set forth in the appended claims.

I claim:

1. In a motor vehicle power transmission having a pair of selectively operable drive control elements, a pair of rails mounted for shifting movement relative to each other along parallel axes; means operably connecting said rails respectively with said drive control elements; an operating member mounted for oscillatory movement about an axis disposed transversely with respect to said parallel axes for imparting shifting movement to said rails; a selector element pivotally mounted on said operating member for swinging movement relatively thereto about an axis disposed transversely to said axis of oscillation for selectively operably connecting said operating member with said rails; operating means engaged with said element for swinging the same; and means for oscillating said member comprising a bevel gear carried by the member, a second bevel gear engaging the aforesaid gear and means for oscillating said second bevel gear.

2. In a motor vehicle power transmission having a pair of selectively operable drive control elements, a pair of rails mounted for shifting movement relative to each other along parallel axes; means operably connecting said rails respectively with said drive control elements; a casing for said rails and elements; a detachable cover for said casing; a rockshaft oscillatably journalled in said cover; a selector element rockably mounted on said rockshaft and adapted to selectively engage said rails; a bevel gear carried by said rockshaft; a second bevel gear journalled in said cover and meshing with the aforesaid gear; and means for oscillating said second bevel gear.

3. In a motor vehicle power transmission having a pair of selectively operable drive control elements, a pair of rails mounted for shifting movement relative to each other along parallel axes; means operably connecting said rails respectively with said drive control elements; a casing for said rails and elements; a detachable cover for said casing; a rockshaft oscillatably journalled in said cover; a selector element rockably mounted on said rockshaft and adapted to selectively engage said rails; a bevel gear carried by said rockshaft; a second bevel gear journalled in said cover and meshing with the aforesaid gear; means for rocking said selector element; and means for oscillating said second bevel gear.

4. In a motor vehicle power transmission having a pair of selectively operable drive control elements, a pair of rails mounted for shifting movement relative to each other along parallel axes; means operably connecting said rails respectively with said drive control element; a casing for said rails and elements; a detachable cover for said casing; a rockshaft oscillatably journalled in said cover; a selector element rockably mounted on said rockshaft and adapted to selectively engage said rails; a bevel gear carried by said rockshaft; a second bevel gear journalled in said cover and meshing with the aforesaid gear; means for rocking said selector element including a lever carried by said cover and having a lug positively engaged with said element; and means for oscillating said second bevel gear.

5. In a motor vehicle power transmission having a pair of selectively operable drive control elements, a pair of shift members mounted for shifting movement relative to each other along parallel axes and connected respectively with said drive control elements; a casing for said members and elements; a detachable cover for said casing; a rockshaft oscillatably journalled in said cover; means rockably carried by said rockshaft for selectively engaging said shift members; a shaft journalled in said cover and disposed perpendicularly to said rockshaft; bevel gears operably connecting said shaft with said rockshaft; and means for oscillating said shaft.

JOHN G. TYKEN.